United States Patent
Suprakas et al.

(10) Patent No.: US 10,767,018 B2
(45) Date of Patent: Sep. 8, 2020

(54) ISOTACTIC POLYPROPYLENE BASED COMPOSITE

(71) Applicant: CSIR, Pretoria (ZA)

(72) Inventors: Ray Sinha Suprakas, Pretoria (ZA); Jayita Bandyopadhyay, Pretoria (ZA); Mary Khoza, Rustenburg (ZA); Vincent Ojijo, Pretoria (ZA); Manfred Rudolf Scriba, Die Wilgers (ZA)

(*) Notice: Subject to any disclaimer, the term of this patent is extended or adjusted under 35 U.S.C. 154(b) by 0 days.

(21) Appl. No.: 15/686,991

(22) Filed: Aug. 25, 2017

(65) Prior Publication Data
US 2018/0057642 A1    Mar. 1, 2018

(30) Foreign Application Priority Data

Aug. 26, 2016   (ZA) .................... 2016/05959

(51) Int. Cl.
| | |
|---|---|
| *C08J 3/05* | (2006.01) |
| *C08F 8/48* | (2006.01) |
| *C08F 8/42* | (2006.01) |
| *C08F 255/02* | (2006.01) |
| *C08F 8/12* | (2006.01) |
| *C08L 23/12* | (2006.01) |
| *C08L 51/06* | (2006.01) |
| *C08J 3/00* | (2006.01) |
| *C08J 3/24* | (2006.01) |

(52) U.S. Cl.
CPC ............... *C08J 3/005* (2013.01); *C08F 8/12* (2013.01); *C08F 8/42* (2013.01); *C08F 8/48* (2013.01); *C08F 255/02* (2013.01); *C08J 3/246* (2013.01); *C08L 23/12* (2013.01); *C08L 51/06* (2013.01); *C08J 2323/12* (2013.01); *C08J 2351/06* (2013.01); *C08J 2423/12* (2013.01); *C08J 2451/06* (2013.01)

(58) Field of Classification Search
CPC ........ C08J 3/005; C08J 3/246; C08J 2323/12; C08J 2351/06; C08J 2423/12; C08J 2451/06; C08F 8/12; C08F 8/42; C08F 8/48; C08F 255/02; C08L 23/12; C08L 51/06
USPC ......................................... 524/81
See application file for complete search history.

(56) References Cited

U.S. PATENT DOCUMENTS 6,319,976 B1 *  11/2001  DeNicola, Jr. ........ C08F 255/00
                                                          524/504

* cited by examiner

*Primary Examiner* — William K Cheung
(74) *Attorney, Agent, or Firm* — Faegre Drinker Biddle & Reath LLP

(57) ABSTRACT

This invention relates to a process for producing an isotactic polypropylene based composite, comprising: reactive blending of isotactic polypropylene homo-polymer; polypropylene grafted with a carboxylic anhydride or a furan type moiety such as maleic anhydride grafted polypropylene; and an amino silane such as (3-aminopropyl)triethoxysilane to produce an isotactic polypropylene based composite such that the crystallization temperature of the isotactic polypropylene based composite is in a range of about 120° C. to about 126° C. The reactive blending can further take place in the presence of an organically modified nanoclay.

26 Claims, 19 Drawing Sheets

ISOTACTIC POLYPROPYLENE BASED COMPOSITE

CROSS-REFERENCE TO RELATED APPLICATIONS

This application claims the benefit of South African Application No. 2016/05959, filed Aug. 26, 2016, the entire disclosure of which is hereby expressly incorporated by reference herein.

BACKGROUND TO THE INVENTION

THIS invention relates to an isotactic polypropylene based composite and more particularly to the production of the highly nucleating isotactic polypropylene composite.

Polypropylene (PP) is one of the most widely used commodity polymers because of its excellent cost-performance value. However, PP has a low upper service temperature [1], which can be correlated with the heat distortion temperature (HDT) and Vicat softening point. One way to address this drawback is to introduce cross-linking between polymer chains because cross-linking leads to a polymer matrix with higher thermal and thermo-mechanical stabilities [1]. In the case of PP, the chemical inertness makes functionalization and cross-linking very difficult. One way to cross-link PP chains is via peroxide reactions followed by silane-water cross-linking. Free radicals are usually generated during peroxide reactions in the first step. In the second step, the silane-grafted polymer is cross-linked via exposure to a humid environment [2]. However, both steps are tedious and not commercially viable.

Another potential approach is the incorporation of additives, such as inorganic fillers [3-6], cellulose [7], natural fibers [8], etc. Several studies have been conducted on the effect of additives on the thermo-mechanical properties of PP. In most cases, surface treated fillers were used to improve the interfacial interaction between the polymer matrix and filler surface. For example, to improve the dispersion of glass fibers in the PP-matrix, it was necessary to modify the glass fiber surface with γ-aminopropyltriethoxysilane [3]. So far, the greatest improvement in HDT of PP was achieved with 50% cellulose in the presence of maleic anhydride-grafted PP (PP-g), and it is approximately 66° C. higher than that of neat PP (MFI=75 g/10 min, measured at 230° C. and 2.16 kg) [7]. Therefore, by adding fillers, the HDT of PP can be improved to a certain extent.

Another challenge with the PP matrix is its lower crystallization temperature. In the molding industry, the cycle time is dependent on the crystallization temperature of the polymeric material. Therefore a polymeric material having a low crystallization temperature requires a longer cycle time in the molding process. As a result more energy is required and which may become costly.

Cross-linking or the introduction of a network structure in a polymer matrix usually imposes restriction on the macromolecular chain mobility. Hence, the cross-linked material can stay rigid and exhibit dimensional stability [9]. In this direction, the restriction on the polymer chain mobility can be obtained by incorporation of filler which in turn also enhances the HDT of the neat polymer matrix [8]. The improvement in the HDT of the PP matrix also depends on other factors, such as crystallinity, crystal size [10], β-crystal formation [11], orientation of crystals in the presence of a nucleating agent [12], and relaxation and recrystallization during thermal annealing [13].

Sirisinha et al. [14] used the silane grafting and water cross-linking method to prepare a PP-based composite with stearic acid-coated calcium carbonate. They found that, besides silane grafting, the addition of stearic acid coated calcium carbonate on top of silane grafting can improve the HDT of PP (MFI=3.64 g/10 min) by 80° C. For this reason, they prepared a master-batch of PP and stearic acid-coated calcium carbonate. Then, the master-batch was tumble-mixed with vinyltrimethoxysilane and dicumyl peroxide solution and kept in a nitrogen environment overnight. Subsequently, the mixture went under further extrusion and molding processes prior to the water crosslinking step. However, this process is tedious and not energy efficient; therefore, it is not commercially viable.

U.S. Pat. No. 4,146,529 Yamamoto et al. [15] discloses reaction of an endo-bicyclo[2.2.1]-5 heptine-2,3dicarboxylic anhydride-modified PP with an amino or epoxy silane. The purpose of this reaction was to use the alkoxy groups to bind the fillers and to react with the non-grafted carboxylic anhydride to form low odor and non-volatile products [15]. A very fast reaction between aminosilane and the grafted acid anhydride was also reported in the European patent EP 1 021 486 B1 on silane vulcanized thermoplastic elastomers [9]. In this case, the carboxylic anhydride was grafted on the rubber phase polymer (elastomer). The authors of EP 10 21 486 B1 used SILQUEST A-186 [γ-(3,4-epoxycyclohexyl) ethyltrimethoxy-silane], SILQUEST A-187 (γ-glycidoxypropyl-trimethoxysilane) and SILQUEST A-189 (γ-mercaptopropyltrimethoxysilane), and studied the effect of mixing sequence on the crosslinking and mechanical properties; however, there were no improvement in the HDT. To overcome this challenge, the authors first blended all of the ingredients for 5 min and then added the thermoplastic polymer and silane. In another process, all of the ingredients were mixed at the same time. However, the end product originating from their reaction mechanism was not a stable one (see, for example, FIG. 1).

Over the last few years, several nucleating agents including nanoclay have been used to improve the crystallization temperature ($T_c$) of PP. Liu et al. [16] reported that in the presence of co-intercalated organoclay (hexadecyltrimethyl-ammonium and epoxypropyl methacrylate-modified montmorillonite, MMT), the crystallization temperature of PP can be improved by 12° C. In presence of PP-g and C15A (commercially available organoclay, Cloisite® 15A), an improvement of 7° C. in $T_c$ can be achieved [17]. The same level of improvement can also be achieved with C20A (commercially available organoclay, Cloisite® 20A) [18]. In the presence of the nucleating agents, such as cis-calcium hexahydrophthalate and disodium bicyclo[2.2.1]heptane-3-dicarboxylate, the $T_c$ of syndiotactic PP improved by 17° C. and 11° C., respectively [19]. However, such nucleating agents might not reduce the odor of MA in PP-g.

It is accordingly an object of the invention to provide an isotactic polypropylene based composite that will, at least partially, alleviate the above disadvantages.

It is also an object of the invention to provide an isotactic polypropylene based composite which will be a useful alternative to existing isotactic polypropylene based composite.

SUMMARY OF THE INVENTION

According to the invention there is provided a process for producing an isotactic polypropylene based composite, comprising:

reactive blending of isotactic polypropylene homo-polymer; polypropylene grafted with a carboxylic anhydride or a furan type moiety such as maleic anhydride grafted polypropylene; and an amino silane such as (3-aminopropyl) triethoxysilane to produce an isotactic polypropylene based composite.

Preferably the reactive blending further takes place in the presence of an organically modified nanoclay.

The inorganic content of the organically modified nanoclay in the composite may be kept constant in a range of about 0.5 to about 2 wt %, preferably about 1 wt %.

According to the invention, a preferred grafting level of the carboxylic anhydride in the polypropylene grafted with the carboxylic anhydride or the furan type moiety in the polypropylene grafted with the furan type moiety may be in a range of about 0.5% to about 2%, preferably about 1%.

Typically, the molar mass ratio of carboxylic anhydride or the furan type moiety:an amino silane may be in a range of about 0.5:0.33 to about 1:2, preferably about 1:1.

Typically, the composition ratio of polypropylene:carboxylic anhydride or the furan type moiety grafted polypropylene may be in a range of about 49:1 to about 1:1, preferably about 3:1.

The carboxylic anhydride grafted polypropylene or the furan type moiety grafted polypropylene and organically modified nanoclay are preferably dried before the reaction. The carboxylic anhydride grafted polypropylene or the furan type moiety grafted polypropylene and organically modified nanoclay may be dried for about 24 hours under vacuum at about 100° C.

The reaction between the maleic anhydride grafted polypropylene (PP-g) and (3-aminopropyl)triethoxysilane produces N-substituted maleimide-grafted polypropylene.

Preferably, the N-substituted maleimide-grafted polypropylene is represented by the structure:

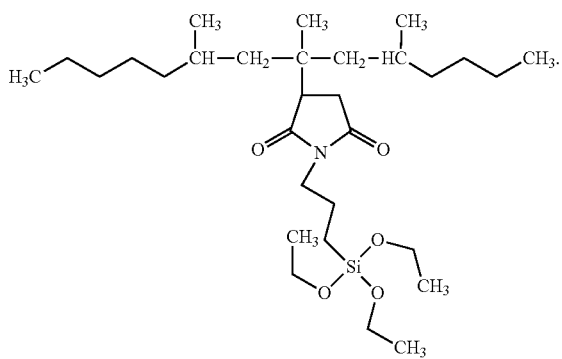 [SMILES: CCCCCC(C)CC(C)(CC(C)CCCC)C1CC(=O)N(CCC[Si](OCC)(OCC)OCC)C1=O]

Typically the organically modified nanoclay is nanoclay silicate layers, preferably a 2:1 layered silicate modified with a thermally stable surfactant suitable for the preparation of isotactic polypropylene based composite such as 2 hydrogenated tallow quaternary ammonium surfactant.

The organically modified nanoclay is preferably Betsopa OM™.

The crystallization temperature of the isotactic polypropylene based composite produced from the reactive blending of isotactic polypropylene homo-polymer; polypropylene grafted with a carboxylic anhydride or a furan type moiety; and the amino silane is preferably in a range of about 120° C. to about 126° C., typically about 125.5° C.

The crystallization temperature of the isotactic polypropylene based composite produced from the reactive blending of isotactic polypropylene homo-polymer; polypropylene grafted with a carboxylic anhydride or a furan type moiety; and the amino silane in the presence of an organically modified nanoclay is preferably in a range of about 126° C. to about 135° C., typically about 129° C.

The crystallization temperature of the isotactic polypropylene based composite produced from the reactive blending of isotactic polypropylene homo-polymer; polypropylene grafted with a carboxylic anhydride or a furan type moiety; and the amino silane is preferably in a range of about 6° C. to about 13° C. above the crystallization temperature of a neat polypropylene polymer, typically about 12° C.

The crystallization temperature of the isotactic polypropylene based composite produced from the reactive blending of isotactic polypropylene homo-polymer; polypropylene grafted with a carboxylic anhydride or a furan type moiety; and the amino silane in the presence of an organically modified nanoclay is preferably in a range of about 13° C. to about 21° C. above the crystallization temperature of a neat polypropylene polymer, typically about 15.5° C.

The invention also covers an isotactic polypropylene (PP) based composite produced according to the process described.

DETAILED DESCRIPTION OF THE INVENTION

Figure 1:
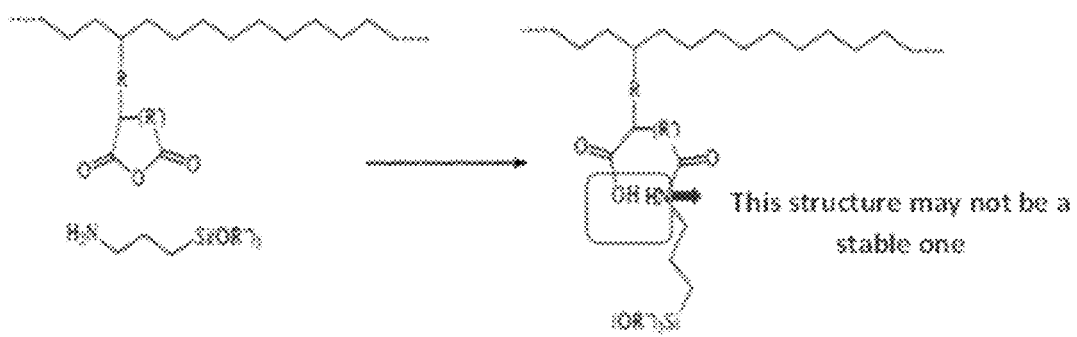
FIG. 1 is a reaction mechanism of maleic anhydride and silane in European patent EP 1 021 486 B1.

In accordance with the present invention there is provided a simple and industrially viable processing technique to produce an isotactic polypropylene based composite with an exceptionally high crystallization temperature and appreciable level of improvements in heat distortion temperature is disclosed.

Usually, carboxylic anhydride, e.g., the maleic anhydride (MA) portion in PP-g, is used as a compatibilizer to enhance the interactions between immiscible polymers or the polymer and the filler material. Although the main role of PP-g is the compatibilization of PP, either with other polymers or the filler, it is sometimes difficult to achieve high-level improvements in properties in such a blend or composite. The main reason for this is the shorter chain length of PP-g; however, the chain length can be increased via network formation. It is assumed that, in the presence of aminosilane, the MA portion of PP-g will react with the amine functional group of the silane. This reaction may reduce the odor of MA. Further this reaction may introduce chain bulkiness or the formation of a network structure or increase the molecular weight of PP-g. As a result, the mobility of the polymer chains will be hindered. Such restriction on the polymer chain mobility can improve the upper service temperature or HDT of the resulting blend and composite.

A detailed study using various characterization techniques confirmed that, during processing at high temperature, the reaction between the maleic anhydride portion of maleic anhydride-grafted polypropylene and aminosilane leads to the formation of N-substituted maleimide-grafted PP. This reaction was responsible for the higher molecular weights of the (3-aminopropyl)triethoxysilane-containing propylene blends and composites. The higher molecular weight or chain bulkiness retards dimensional changes, resulting in higher thermal stability against melting. The formation of N-substituted maleimide-grafted polypropylene allows the polymer chains to crystallize at high temperatures. This was further improved in the presence of well-dispersed nanoclay silicate layers in the blend matrix. For this reason, the polypropylene matrix crystallized at a very high temperature when compared with neat polypropylene matrix. An improved crystallization temperature of about 15.5° C. has been achieved for isotactic polypropylene homo-polymer based composites. Such an improvement has a huge economic benefit to the molding industry because it will significantly reduce the cycle time of the molding process. Moreover, the HDT of the composite improved moderately without altering the Vicat softening temperature. The invention further provides for a high-performance design of polypropylene/clay composites by reactive blending in the presence of maleic anhydride-grafted polypropylene and 3-aminopropyltriethoxysilane in an industrially viable condition.

Materials

In one embodiment, an organically modified South African bentonite (commercial product, Betsopa™) is used as a filler and (3-aminopropyl)triethoxysilane (3APTES) is used as a chain extender for the network formation. The organically modified South African bentonite is a 2:1 layered silicate modified with a thermally stable surfactant suitable for the preparation of polypropylene such as 2 hydrogenated tallow quaternary ammonium surfactant. The filler may also be any 2:1 layered silicate modified with a thermally stable surfactant suitable for the preparation of polypropylene such as 2 hydrogenated tallow quaternary ammonium surfactant, for example Cloisite 20A. In the first step, the mechanism of reaction between MA of PP-g and 3APTES has been investigated by blending PP, PP-g and 3APTES. The grafting level of the maleic anhydride in the PP-g is about 1%, preferably 0.75% to 1.5%. Thereafter, the role of this reaction in the nanoclay-based PP composite was investigated using various techniques, such as Fourier transform infrared (FTIR) spectroscopy, X-ray diffraction (XRD), melt-state rheology, polarized optical microscopy (POM) and heat distortion temperature (HDT) and Vicat softening point measurements.

The chemical structure of PP-g, 3APTES and the surfactant used to modify Betsopa are presented in different parts of Scheme 1.

Scheme 1. Chemical structure of (a) MA-grafted PP (PP-g), (b) 3 APTES and (c) the surfactant used to modify Betsopa OM™. (d) Mechanism of reaction between the amine groups of 3 APTES and the MA in the PP-g.

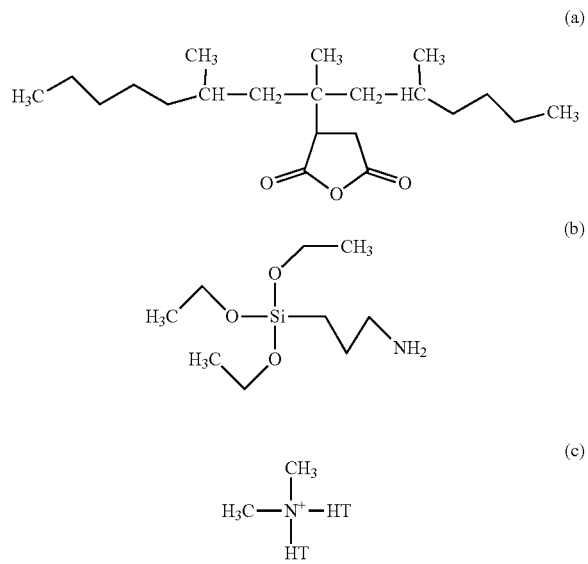

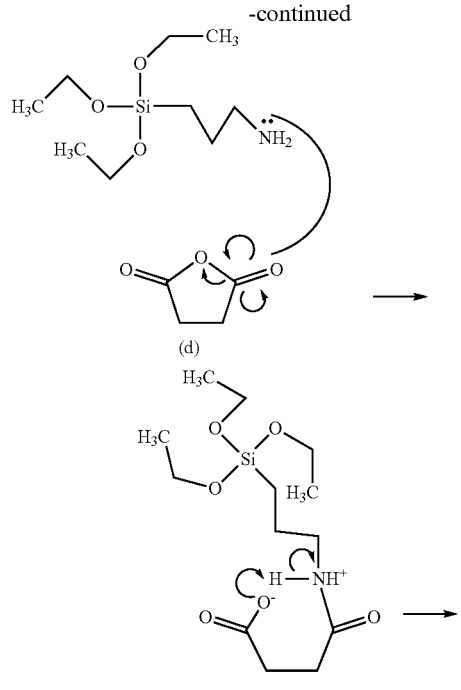

(d)

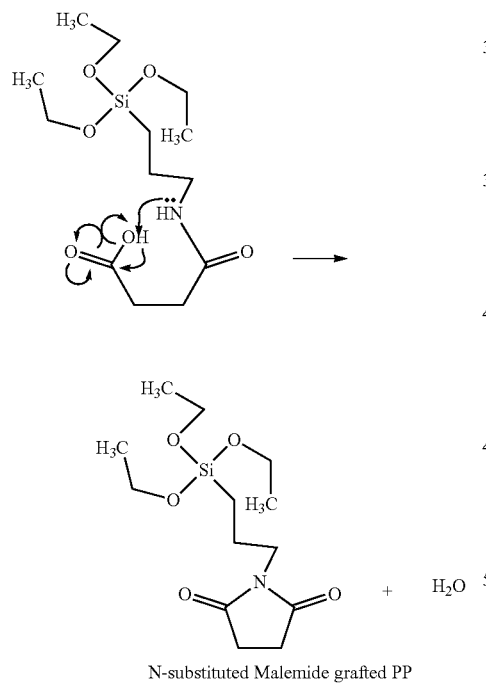

N-substituted Malemide grafted PP

In another embodiment, a polypropylene grafted with a furan type moiety can be used in the reactive blending. It is evident from the parts a and b of Scheme 2 below that furan and maleic anhydride has quite similar structures. According to the proposed reaction mechanism oxygen of the ring (indicated by the solid box in the Scheme 2) reacts with amino silane and forms N-substituted maleimide-grafted structure (refer to part c of Scheme 2). Other two oxygen of maleic anhydride (indicated by dash boxes) doesn't take part in the reaction and remain intact in the N-substituted maleimide-grafted structure.

Scheme 2. Chemical structure of (a) furan, (b) maleic anhydride and (c) N-substituted maleimide-grafted polypropylene.

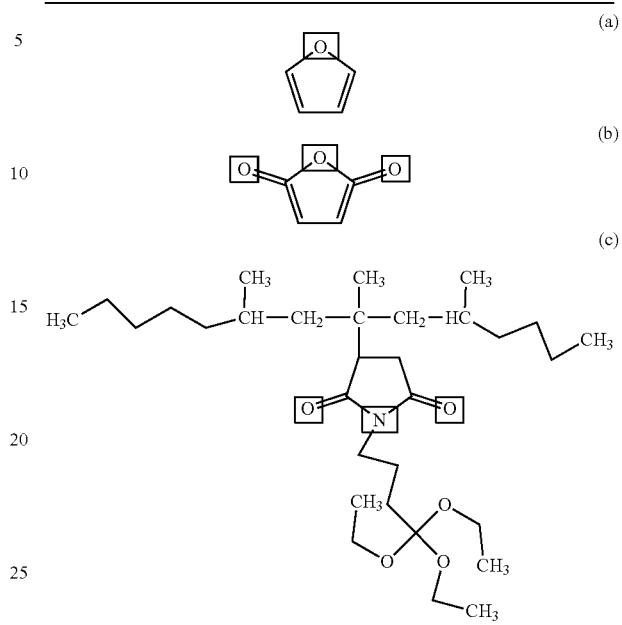

Processing of Blend and Composites

A PP to PP-g composition ratio of 75:25 was used for this study, preferably a PP to PP-g composition ratio of 30:1 to 1:1, more preferably or 20:1 to 1:1, typically 10:1 to 1:1. Based on preliminary investigation of the molar mass ratio of MA (present in PP-g) to 3APTES, it was found that the molar mass of MA:3APTES=1:1, preferably 1:0.8 to 1:1.5, showed better results. In the composites, the inorganic content of Betsopa was kept constant (about 1 wt %). Prior to processing PP-g and Betsopa were dried for 24 h under vacuum at 100° C.

Figure 2:
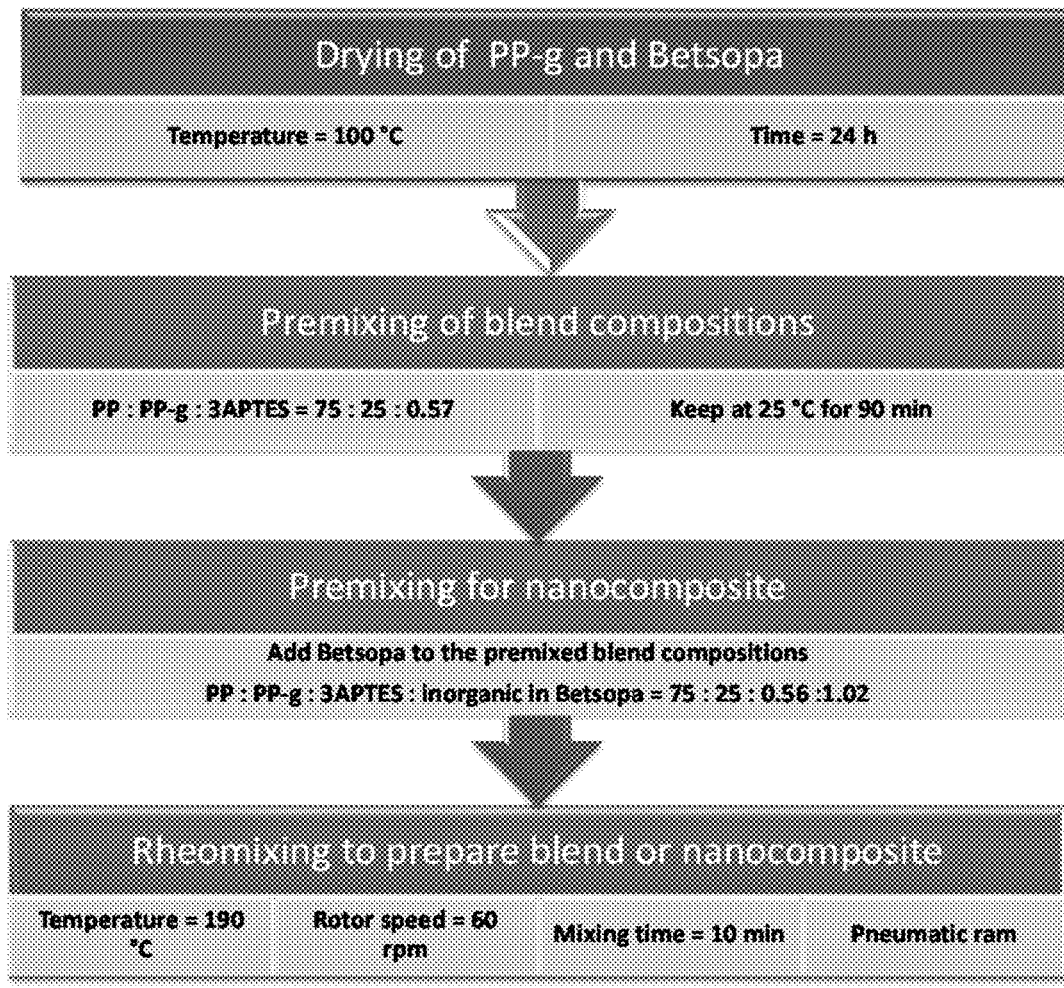
FIG. 2 is a process flow chart for reactive blending of PP.

The neat PP and PP-g blends with or without 3APTES and PP, PP-g and Betsopa composites with or without 3APTES were processed in a Polylab Thermo-Haake rheomixer (Polylab OS Rheodrive 4) equipped with a twin-roller rotor 600 at a rotor speed of 60 rpm and 190° C. The total mixing time was 10 min. An example of the process flow chart for the reactive blending is shown in FIG. 2. However, a wider temperature window of 180-200° C. and rotor speed 60-80 rpm can be used. A pneumatic ram was used during mixing in the rheomixer. To prepare samples for various characterizations, the melt-blended samples were compression molded at 190° C. The samples were first melted at 190° C. for 6 min, and then, a pressure of 1 MTon was applied for 2 min. The samples can be molded within the temperature range of 180-200° C. The molded samples were cooled to room temperature using tap water, and the pressure was released. The composition ratio, blending conditions and samples abbreviations are summarized in Table 1.

TABLE 1

The identities and compositions of the samples

| Sample identity | Composition-ratio | Blending condition |
|---|---|---|
| R-PP | Neat PP HHR102 after rheomixing | Direct rheomixing |

TABLE 1-continued

The identities and compositions of the samples

| Sample identity | Composition-ratio | Blending condition |
|---|---|---|
| Blend | PP:PP-g = 75:25 | Direct rheomixing |
| Blend-Betsopa | PP:PP-g:inorganic in Betsopa = 75:25:1.02 | Direct rheomixing |
| Blend-3APTES | PP:PP-g:3APTES = 75:25:0.57 | All three materials were premixed and kept for 90 min prior to melt blending in the rheomixer. |
| Blend-Betsopa-3APTES | PP:PP-g:3APTES:inorganic in Betsopa = 75:25:0.56:1.02 | All three materials were premixed and kept for 90 min Betsopa was added to this mixture just before the melt blending in the rheomixer. |

Proposition of Reaction Mechanism

It was assumed that a reaction is possible between the amine groups of 3APTES with the MA in PP-g. Such a reaction may lead to the formation of different functional groups that are absent in the starting materials. The FTIR spectroscopic investigation usually provides information about the functional groups present in the different specimens.

The FTIR spectra of 3APTES, Blend-3APTES and Blend-Betsopa-3APTES are presented in FIGS. 3 and 4. It is interesting to note that the molecular vibrations of 3APTES change after blend and composite formation. As depicted in FIG. 3A, the C—C stretching vibrations of 3APTES have most likely shifted from 763 $cm^{-1}$ to 722 $cm^{-1}$ in the 3APTES-containing blend and composite [20]. The restriction on the C—C stretching may result in such a shift towards higher energy (lower wavenumber) side. Such a vibration also appears in the Blend at 720 $cm^{-1}$. This indicates that the C—C stretching vibrations originating from PP-g and 3APTES are most likely overlapping. The amine C—N stretching vibration usually appears at approximately 1080 $cm^{-1}$ [20]. In the case of 3APTES, it appears at 1074 $cm^{-1}$. However, this vibrational band of 3APTES is also absent in the Blend-3APTES and Blend-Betsopa-3APTES (refer to FIG. 3B).

Moreover, the C=O vibrations at 1544, 1644 and 1782 $cm^{-1}$ disappear in the Blend-3APTES and Blend-Betsopa-3APTES. Instead, a doublet C=O stretching of maleimide appears in the region of 1685-1730 and 1745-1805 $cm^{-1}$ [20]. This again indicates that C=O of MA present in PP-g reacts with 3APTES (refer to FIG. 3C). However, the $CH_3$-asymmetric stretching vibrations (~$1375^{cm-1}$) remain intact during this reaction (refer to FIG. 3D) [20].

Figure 3A:
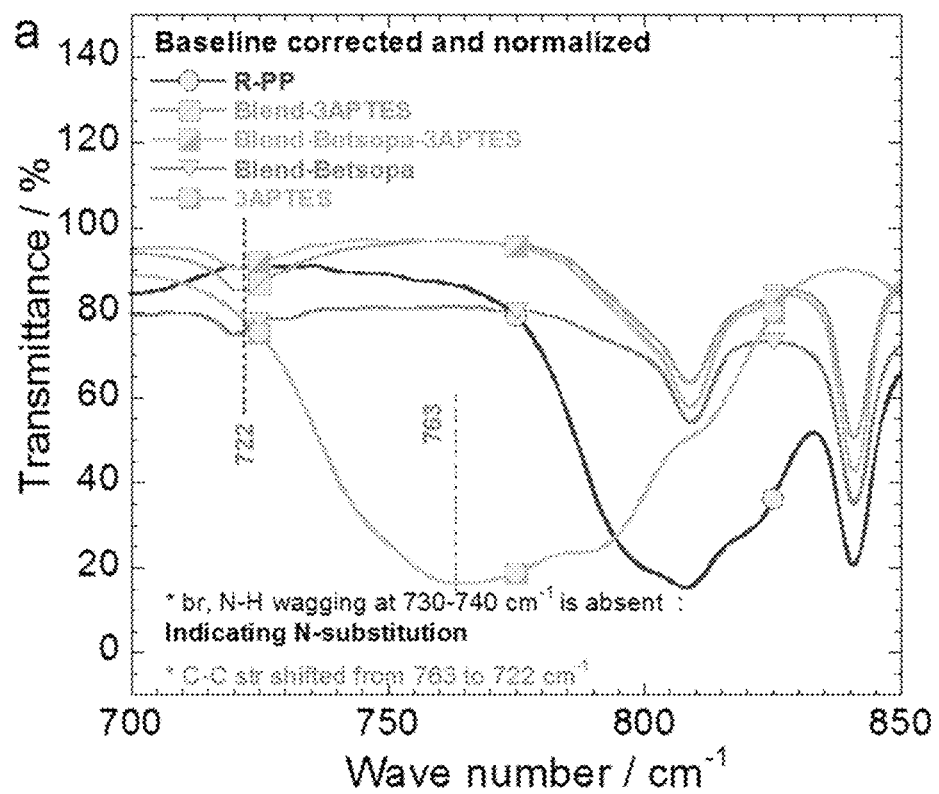
FIG. 3A is an FTIR spectra of (3-aminopropyl)triethoxysilane (3APTES), Blend-3APTES and Blend-Betsopa-3APTES confirming a reaction between maleic anhydride (MA) in maleic anhydride grafted polypropylene (PP-g) and 3APTES.
Figure 3B:
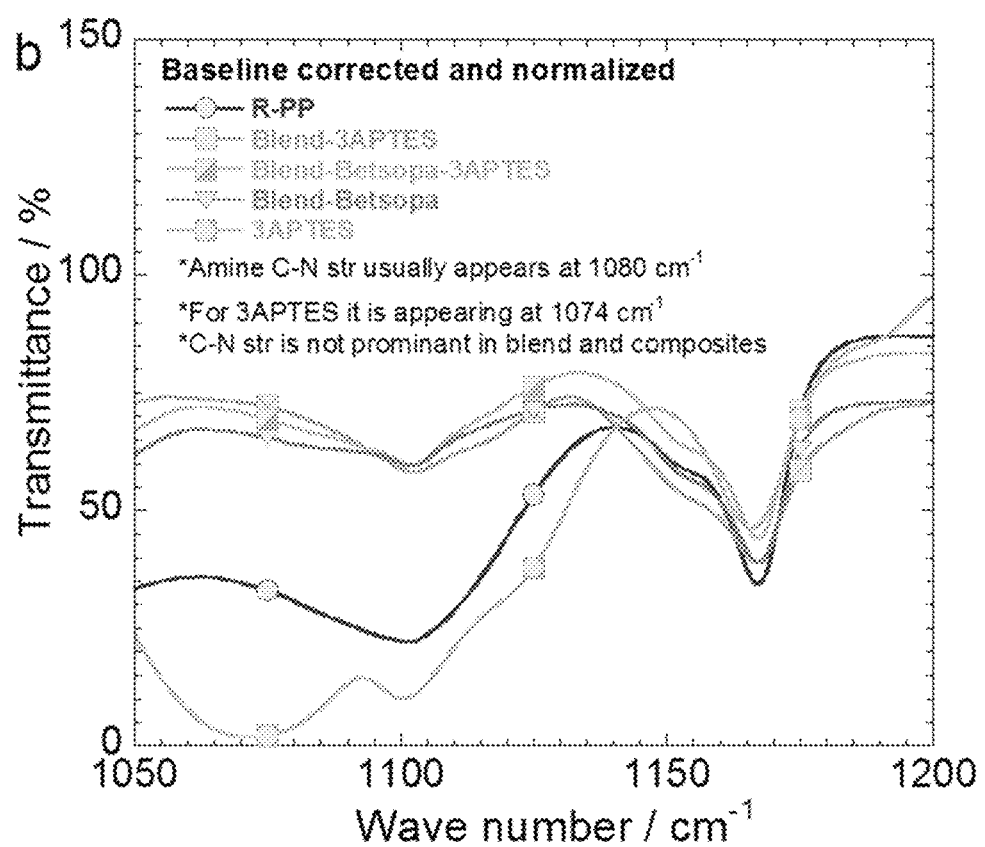
FIG. 3B is an FTIR spectra of (3-aminopropyl)triethoxysilane (3APTES), Blend-3APTES and Blend-Betsopa-3APTES confirming a reaction between maleic anhydride (MA) in maleic anhydride grafted polypropylene (PP-g) and 3APTES.
Figure 3C:
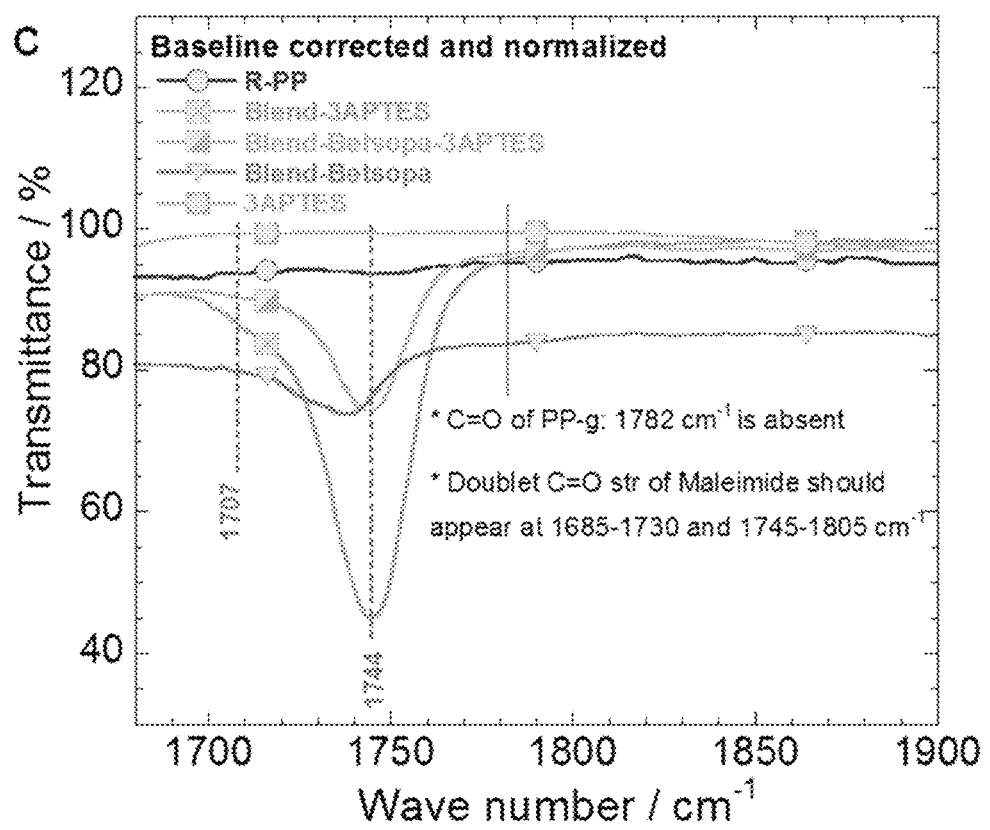
FIG. 3C is an FTIR spectra of (3-aminopropyl)triethoxysilane (3APTES), Blend-3APTES and Blend-Betsopa-3APTES confirming a reaction between maleic anhydride (MA) in maleic anhydride grafted polypropylene (PP-g) and 3APTES.
Figure 3D:
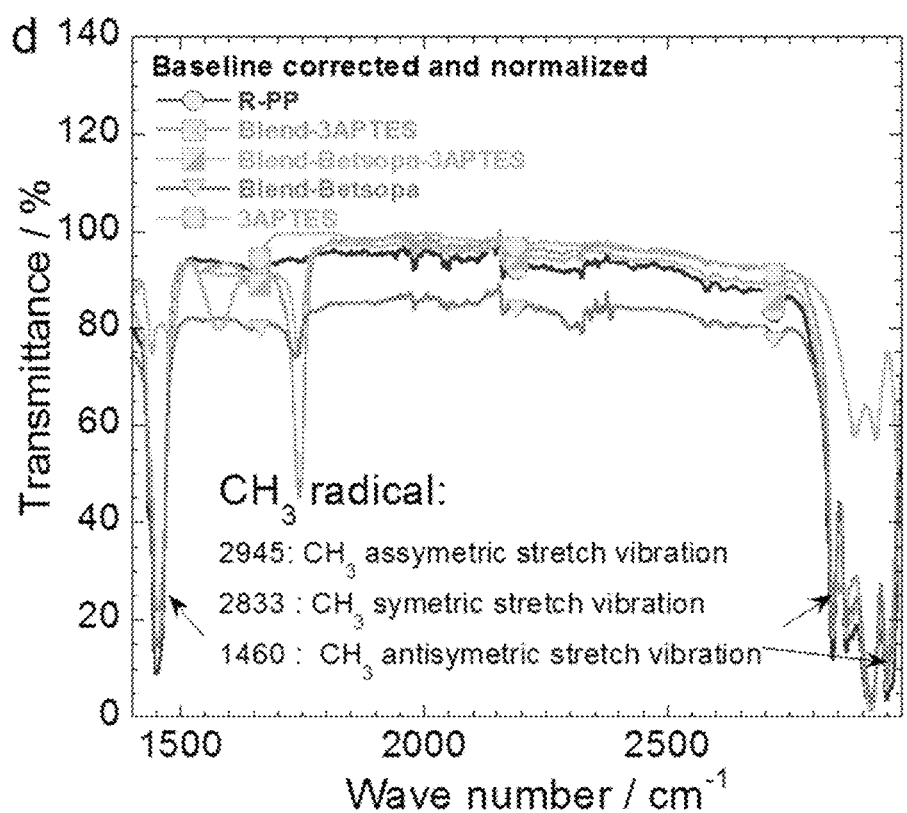
FIG. 3D is an FTIR spectra of (3-aminopropyl)triethoxysilane (3APTES), Blend-3APTES and Blend-Betsopa-3APTES confirming a reaction between maleic anhydride (MA) in maleic anhydride grafted polypropylene (PP-g) and 3APTES.
Figure 4A:
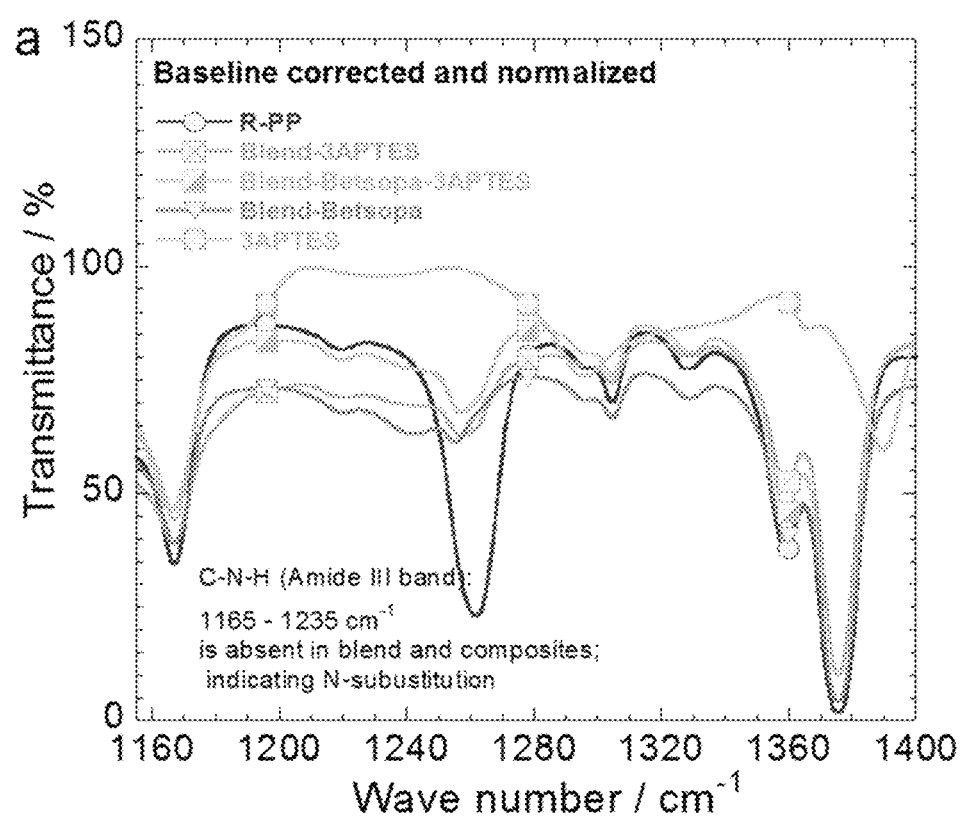
FIG. 4A is an FTIR spectra of 3APTES, Blend-3APTES and Blend-Betsopa-3APTES confirming a reaction between MA present in PP-g and 3APTES.
Figure 4B:
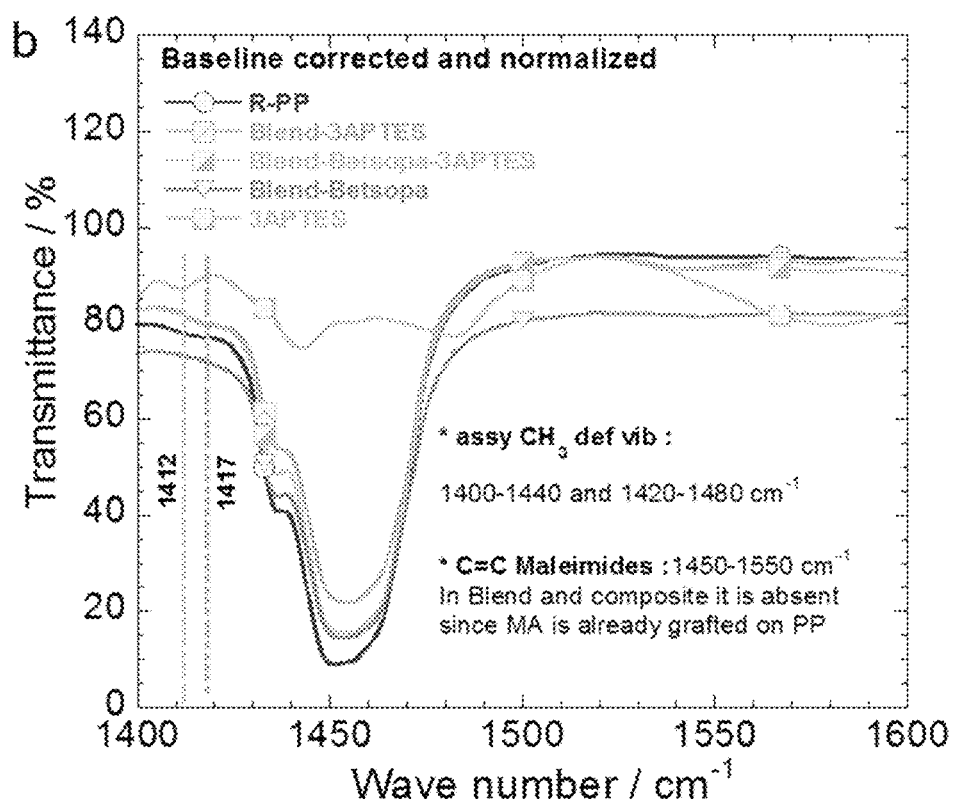
FIG. 4B is an FTIR spectra of 3APTES, Blend-3APTES and Blend-Betsopa-3APTES confirming a reaction between MA present in PP-g and 3APTES.
Figure 4C:
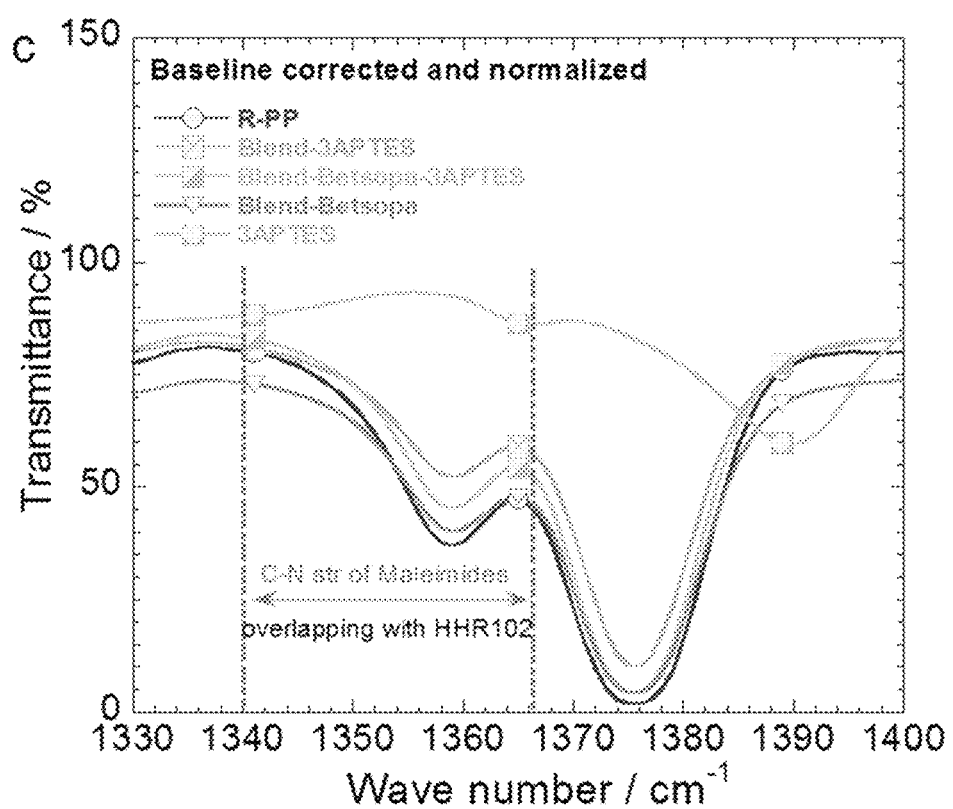
FIG. 4C is an FTIR spectra of 3APTES, Blend-3APTES and Blend-Betsopa-3APTES confirming a reaction between MA present in PP-g and 3APTES.
Figure 4D:
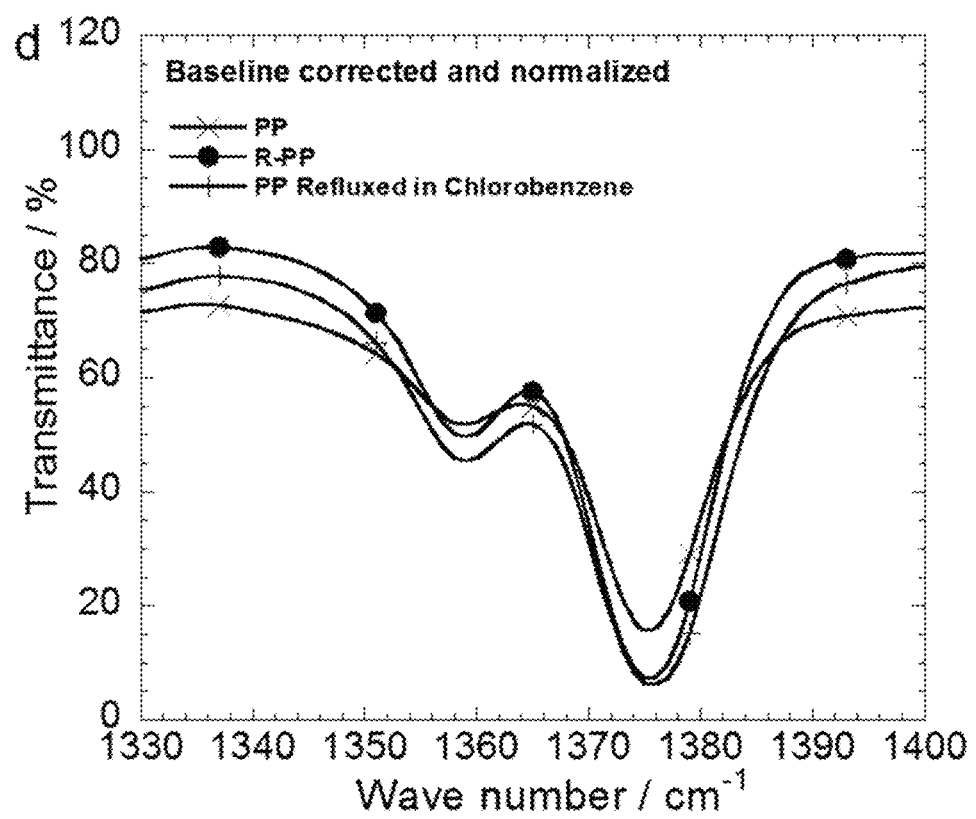
FIG. 4D is an FTIR spectra of compression molded PP before and after rheomixing and after refluxing neat polymer pellets in chlorobenzene.

Detailed analysis of the FTIR spectra (refer to FIGS. 3A,3C; FIGS. 4A,4B,4C) confirms the formation of N-substituted maleimide-grafted PP in the silane containing blend and the composite. Maleimide is a five-membered heterocyclic ring compound. The characteristic FTIR vibrations are amide III (1165-1235 $cm^{-1}$), N—H wagging (730-740 $cm^{-1}$), C—N stretching (1340-1365 $cm^{-1}$), and doublet C=O stretching (1685-1730 and 1745-1805 $cm^{-1}$) [21]. FIG. 4A shows that amide III band (C—N—H) of maleimide is not present in the 3APTES containing blend and the composites. C—N—H results from the coupling of N—H in-plane bending and C—N stretching vibrations [22]. In addition to this, the absence of N—H wagging at 730-740 $cm^{-1}$ again confirms the formation of the N-substituted-modified structure of maleimides (as indicated in FIG. 3A). It is important to note that in case of 3APTES, the N—H wagging vibration is present and appears at approximately 740 $cm^{-1}$. However, it overlaps with other vibrations, e.g., C—C stretching. FIG. 4B also indicates the formation of N-substituted maleimide in the 3APTES containing blend and composite. Usually, the C—N stretching of maleimides occurs at approximately 1340-1365 $cm^{-1}$. However, there is overlap between the vibration of the functional groups present in PP and the C—N stretching of maleimides, as shown in FIG. 4C. To confirm whether these vibrations are really present in the neat PP, the FTIR spectra of compression molded PP before and after rheomixing and after refluxing neat polymer pellets in chlorobenzene were analyzed. The results are summarized in FIG. 4D. According to FIGS. 4C,4D it is difficult to draw a conclusion about the functional groups. In the case of maleimide, C=C stretching appears at 1450-1550 $cm^{-1}$. It is absent in the 3APTES containing blend and composite. This is natural because during grafting of MA on PP, C=C (present in MA) changes into C—C. However, this site does not interfere in the reaction between the MA portion of PP-g and 3APTES.

Therefore, on the basis of FTIR analysis we can conclude that the reaction between the amine groups of 3APTES and the MA in the PP-g forms N-substituted maleimide-modified PP. The mechanism of the proposed reaction is presented in Scheme 1. From this reaction, it can be expected that the formation of an N-substituted maleimide-like structure will enhance the bulkiness of the PP-g polymer chain, which will increase the molecular weight (weight average, $M_w$) of the Blend-3APTES. It may also enhance the physical cross-linking (entanglements) among the polymer chains. The entanglements and molecular weight can be improved to a further extent by incorporation of Betsopa in this blend. It is expected that such an improvement in molecular weight or chain bulkiness will retard the dimensional changes. Hence, we expect that the HDT of the material will improve.

Figure 5A:
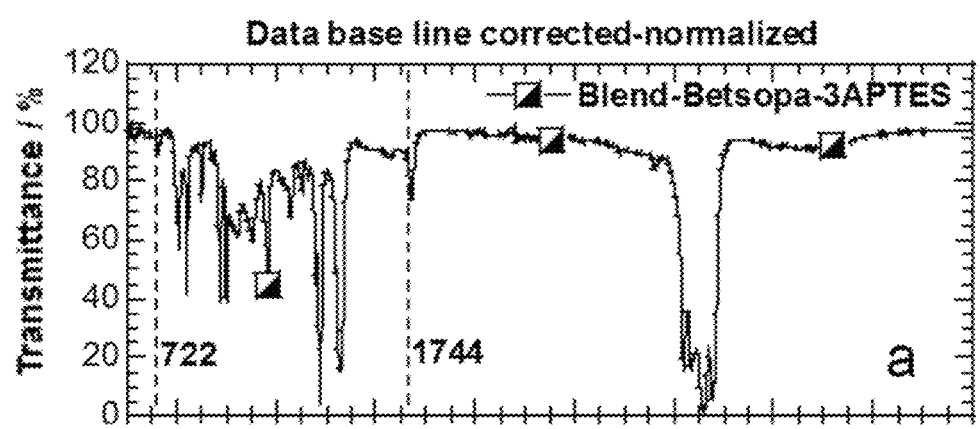
FIG. 5A is an FTIR spectrum of Blend-Betsopa-3APTES.
Figure 5B:
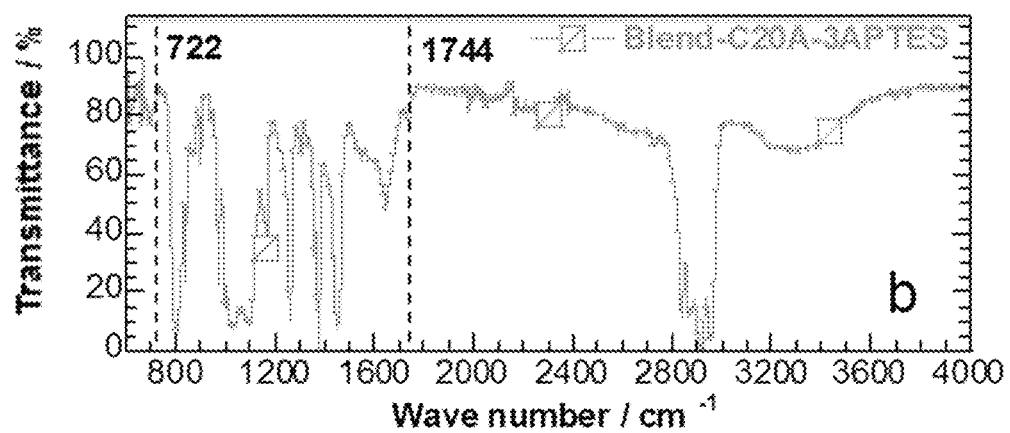
FIG. 5B is an FTIR spectrum of Blend-C20A-3APTES.

To investigate the effect of nanoclay on the formation of N-substituted maleimide grafted PP, Blend-C20A-3APTES was prepared with the same processing condition as Blend-Betsopa-3APTES. The FTIR spectra of Blend-Betsopa-3APTES and Blend-C20A-3APTES are presented in FIG. 5. According to this figure, in both nanocomposites C—C stretching and C=O stretching vibrations of N-substituted maleimide appears at 722 and 1744 $cm^{-1}$, respectively. This confirms the formation of N-substituted maleimide grafted PP doesn't depend on the variety of nanoclay.

Estimation of Molecular Weight and Molar Mass Distribution

Figure 6A:
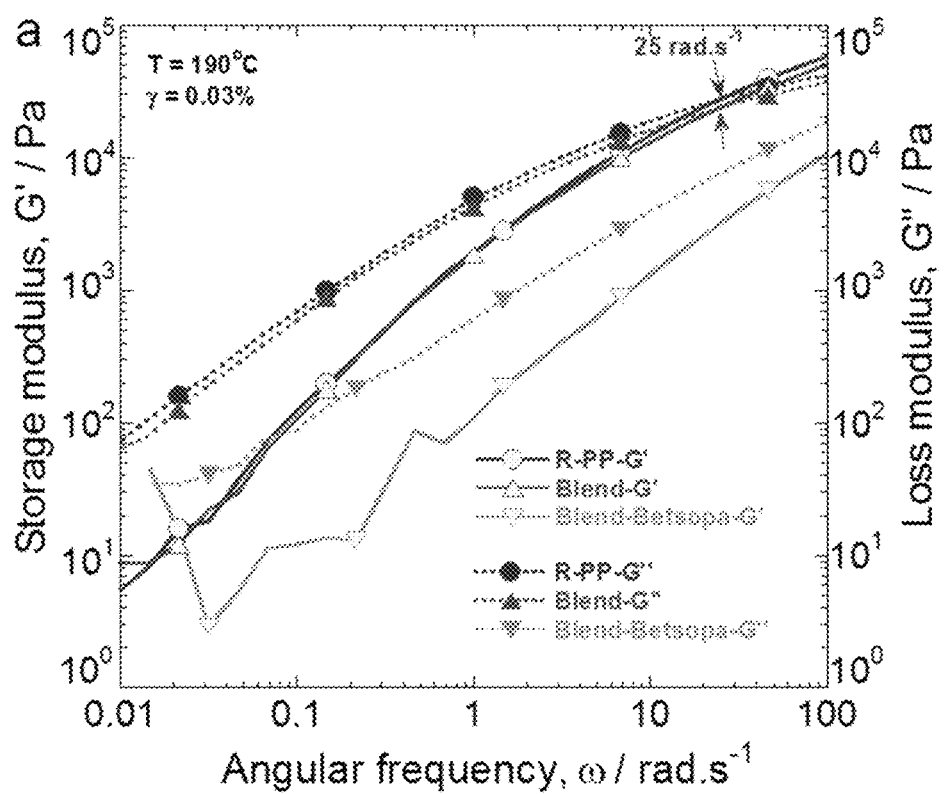
FIG. 6A is a graph depicting variation of storage and loss moduli as functions of angular frequency for R-PP and the blend and composite without 3APTES.
Figure 6B:
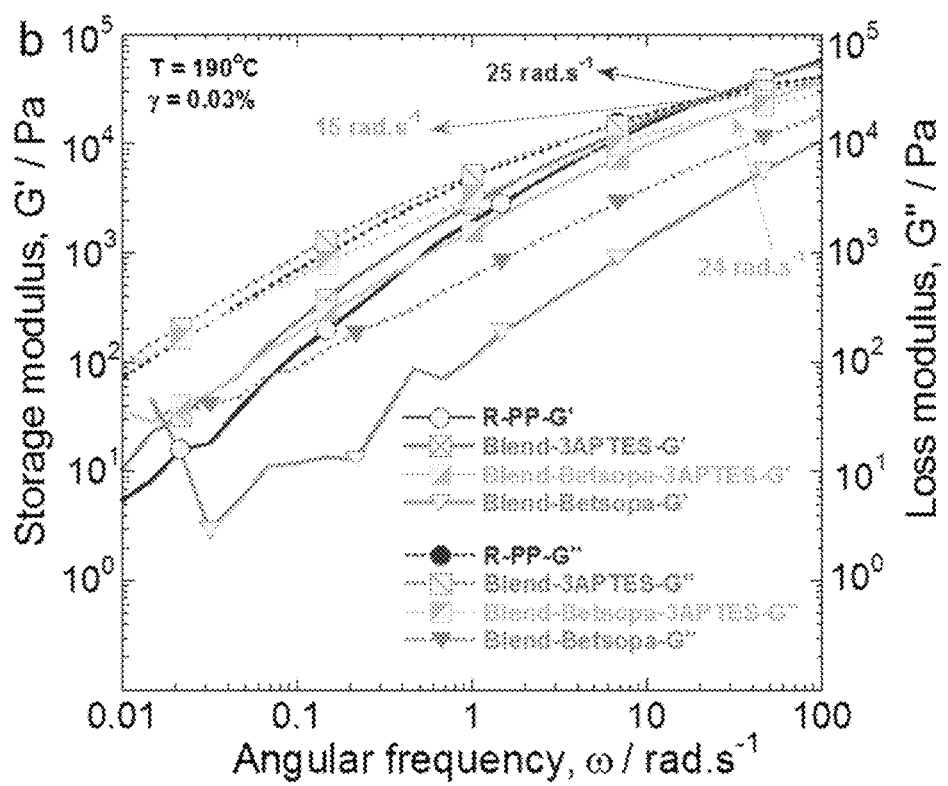
FIG. 6B is a graph depicting variation of storage and loss moduli as functions of angular frequency for blend and composite with 3APTES.

Melt-state rheology under oscillatory shear was employed to estimate the $M_w$. For this purpose the frequency sweeps were carried out at 190° C. in the angular frequency range 100-0.01 rad/s. It is clear from FIGS. 6A, 6B that, except for Blend-Betsopa, all of the samples exhibit crossover points of storage (G') and loss (G") moduli. This means that there is a critical frequency at which the elastic and viscous responses are equal. Usually, the vertical shift of the crossover point provides information about the molar mass distribution (MMD) (an increased modulus indicates a narrower MMD), and the horizontal shift towards lower frequencies indicates an increase in $M_w$ [23]. Hence, from the trend of the horizontal shift of the crossover point, it can be claimed that the $M_w$ increases in the 3APTES containing blends and composites. However, such an improvement in $M_w$ is more homogeneous in the Blend-3APTES compared with the Blend-Betsopa-3APTES. On the other hand, the vertical shift of the crossover point toward lower modulus indicates broadening of the MMD or increasing polydispersity in the case of the 3APTES-containing composite.

The plateau shear modulus ($G_N^0$), $M_w$, the MMD and dispersity index (DI) were roughly calculated from the dynamic moduli obtained during the frequency sweeps [24]. The values of $G_N^0$, the molecular weights and PDI of different samples are reported in Table 2. $G_N^0$ of R-PP is 12 880 Pa. It is interesting to note that in the presence of Blend, $G_N^0$ decreases to 9 553 Pa. $G_N^0$ decreases further in Blend-Betsopa. An improvement in $G_N^0$ can be obtained by incorporating 3APTES in the Blend. The plateau shear modulus of Blend-3APTES is even higher than R-PP. Betsopa in the presence of 3APTES facilitates such an improvement in $G_N^0$ in Blend-Betsopa-3APTES.

Figure 6C:
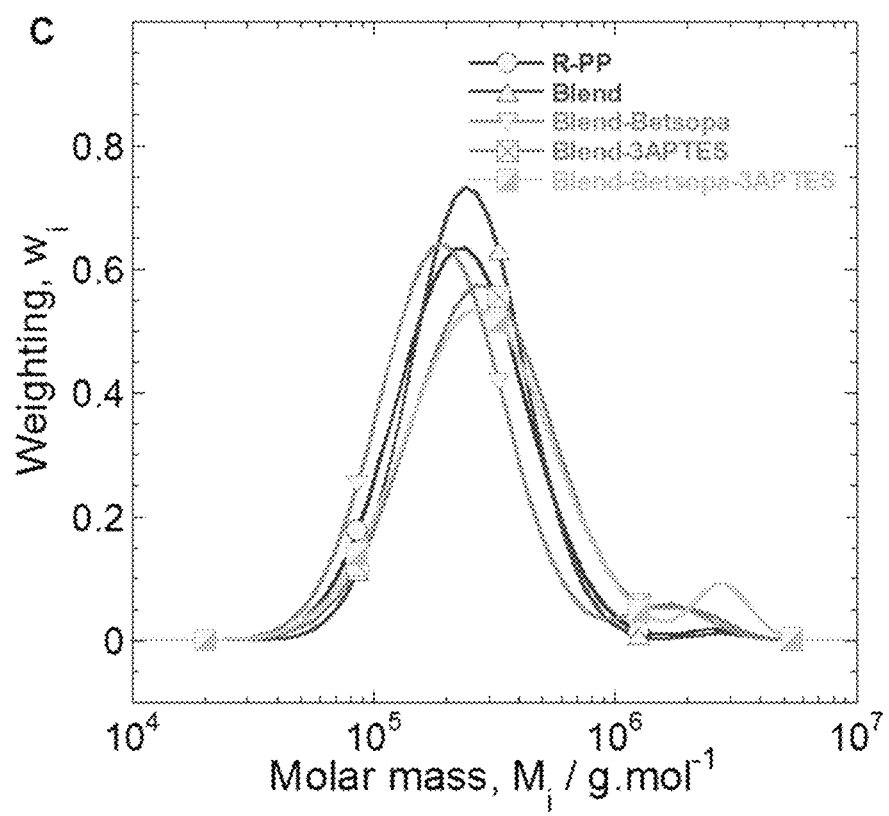
FIG. 6C is a graph depicting the molar mass distribution of R-PP, Blend, Blend-Betsopa, Blend-3APTES and Blend-Betsopa-3APTES.

A similar trend in $G_N^0$ can be observed for both $M_n$ (number average molecular weight) and $M_w$. Compared with other samples, a significant improvement in $M_w$ can be achieved in Blend-Betsopa-3APTES. The MMD of different samples are presented in FIG. 6C. It is clear from this figure that Blend exhibits a narrower MMD than the rest of the samples. Although $M_w$ and MMD were determined for Blend-Betsopa, it is difficult to draw a conclusion from this result because the material behavior becomes unstable above 0.66 rad/s. The MMD shifts towards the higher $M_w$ side in the case of Blend-3APTES and Blend-Betsopa-3APTES. A noticeable improvement in $M_w$ can be achieved in the presence of both 3APTES and Betsopa. Such an enhancement in $M_w$ again supports the formation of bulky groups due to the reaction between the MA in PP-g and 3APTES. Due to the narrow MMD, Blend (refer to the DI value reported in Table 2) exhibits the least polydispersity; however, it increases slightly in the presence of 3APTES and Betsopa.

Figure 6D:
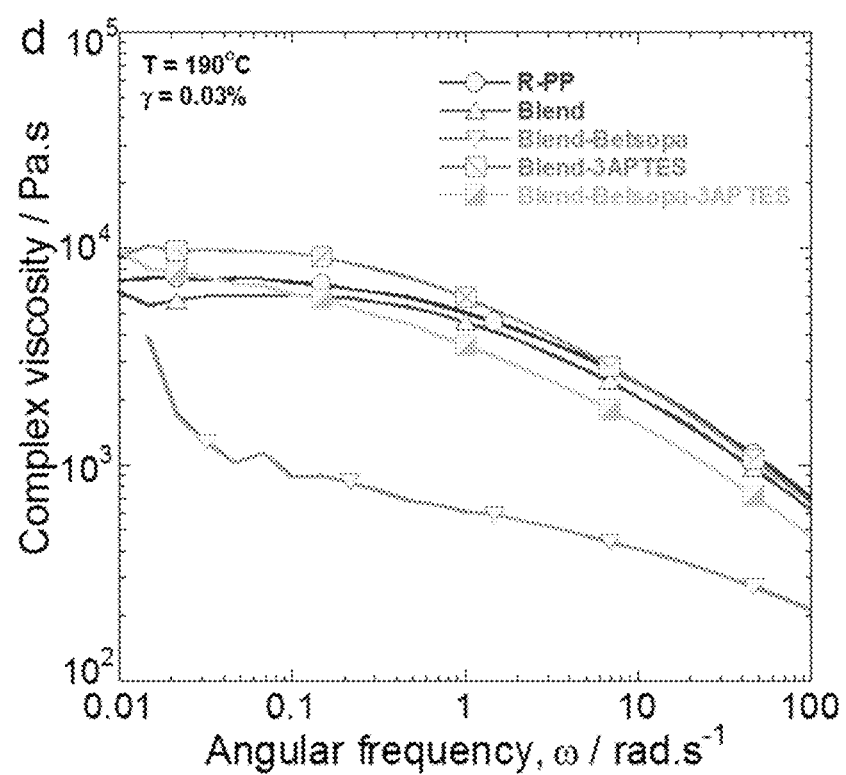
FIG. 6D is a graph depicting complex viscosity of R-PP, Blend, Blend-Betsopa, Blend-3APTES and Blend-Betsopa-3APTES as a function of angular frequency.

It is expected that the change in M. and MMD will also affect the viscosity and the flow properties of the materials. The angular frequency dependence of the complex viscosities ($|\eta^*|$) of different samples are presented in FIG. 6D. The result shows that, with decreases in frequency, the viscosity increases and reaches a plateau value in the R-PP, Blend and Blend-3APTES samples. Blend-Betsopa also shows an increase in viscosity up to 0.66 rad/s. The flow becomes unstable and G', G" and $|\eta^*|$ start to show inconsistency in the flow behavior in the lower frequency region. However, the entire frequency range was used to determine the MMD. Hence, the MMD of Blend-Betsopa may not be a true representation. It is interesting to note that Blend-Betsopa-3APTES exhibits a shear thinning nature throughout the examined frequency range.

This flow behavior may facilitate better flow during the molding process. Initially, the viscosity of Blend-Betsopa-3APTES is lower than those of the other samples. While the other samples reach the Newtonian plateau, the viscosity of Blend-Betsopa-3APTES increases continuously. During the faster motion, the polymer structures of the temporary entanglements show more and more inflexibility and rigidity. In this state, more deformation energy can be stored and the loss of deformation energy via friction between the polymer chains due to their relative motion decrease. Thus, the elastic behavior shows increasing dominance with increasing w. On the other hand, with a decrease in ω, the network of entanglements has enough time to become disentangled, and thus, the nanocomposite samples show increasing flexibility and mobility.

TABLE 2

Plateau shear moduli ($G_N^0$), molecular weights and dispersity index (DI) of different samples determined from the frequency sweep.

| Sample | $G_N^0$/Pa | $M_n$/g · mol$^{-1}$ | $M_w$/ g · mol$^{-1}$ | DI |
|---|---|---|---|---|
| R-PP | 12 880 | 307 800 | 669 600 | 2.2 |
| Blend | 9 553 | 302 100 | 568 800 | 1.9 |
| Blend-Betsopa | 6 854 | 312 900 | 860 000 | 2.7 |
| Blend-3APTES | 16 030 | 417 900 | 929 300 | 2.2 |
| Blend-Betsopa-3APTES | 17 230 | 495 000 | 1 426 000 | 2.9 |

Therefore, the frequency sweep results also indirectly support the formation of N-substituted maleimide, which enhances the PP-g polymer chain bulkiness as well as the molecular weights of the 3APTES-containing blends and composites. It is expected that this improvement in molecular weight or chain bulkiness will retard the dimensional changes; therefore, we will find improvements in the HDTs of the blends and composites.

Heat Deflection Temperature and Vicat Softening Point

Figure 7:
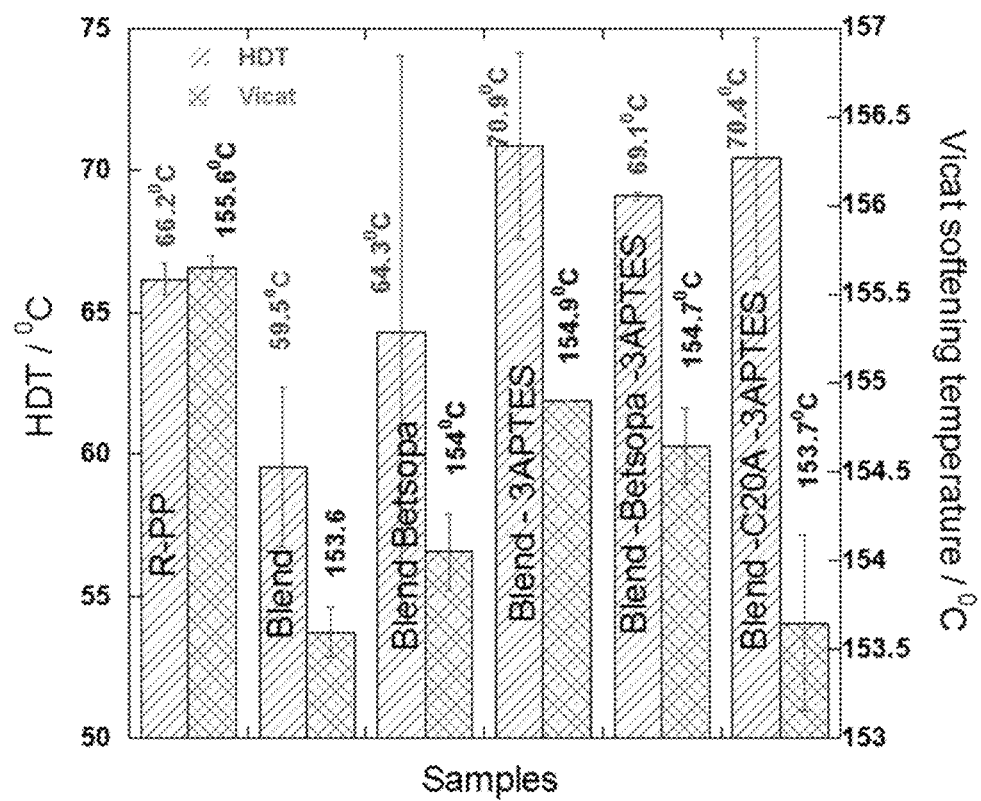
FIG. 7 is a bar graph depicting the results (the average of 2 to 3 experiments) of HDT and Vicat temperatures of R-PP, Blend, Blend-Betsopa, Blend-3APTES, Blend-Betsopa-3APTES and Blend-C20A-3APTES.

The HDT and Vicat temperatures of different samples are reported in FIG. 7. The HDT of R-PP is 66.2° C. Blend and Blend-Betsopa show further decreases in their HDTs compared with R-PP. On the other hand, the HDT improves in the 3APTES-containing blend and composite samples. However, Blend-Betsopa-3APTES samples exhibit better reproducibility when compared with the Blend-3APTES samples. This improvement in HDT can be attributed to the formation of N-substituted maleimide, which enhances the PP-g polymer chain bulkiness and the molecular weight of the respective samples. The reaction between PP-g and 3APTES actually creates a branched structure, as shown in Scheme 3.

Scheme 3. Structutre of N-substituted modified malemide-grafted PP.

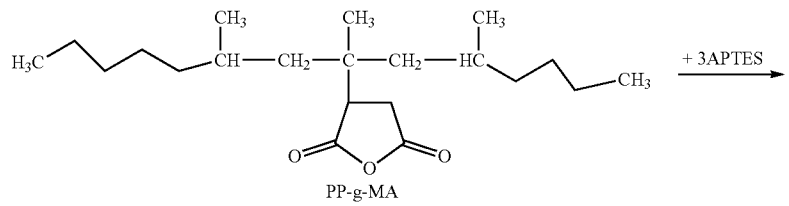

PP-g-MA    + 3APTES →

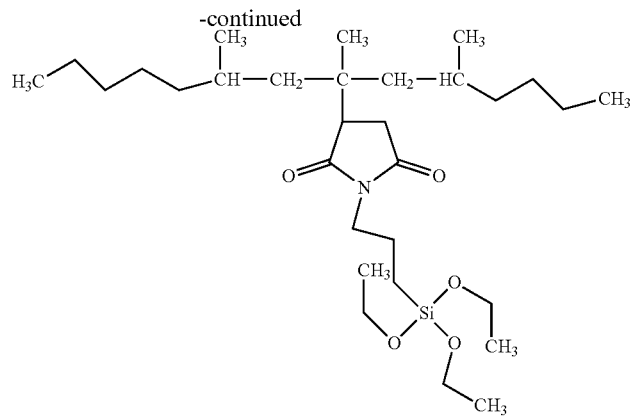

N-substituted modified malemide grafted PP

According to FIG. 7, the Vicat softening point moves towards a lower temperature in Blend. It improves slightly in the presence of Betsopa (referring the Blend-Betsopa sample). The Vicat softening point improves to the same extent as R-PP in the 3APTES-containing blend (Blend-3APTES) and the composite (Blend-Betsopa-3APTES). 3APTES is 125.5° C. Therefore, the reaction between 3APTES and MA improves the crystallization temperature by about 12° C. The crystallization temperature further improved to 129° C. (i.e., by another 3.5° C. when compared with Blend-3APTES) in the presence of nanoclay in Blend-Betsopa-3APTES.

TABLE 3

Thermal parameters associated with the melting and crystallization process.

| Sample | $T_{c\ onset}$/° C. | $T_c$/° C. | $\Delta H_c$/J · g$^{-1}$ | $T_{m1}$/° C. | $T_{m2}$/° C. | $\Delta H_f$/J · g$^{-1}$ |
|---|---|---|---|---|---|---|
| R-PP | 134.7 | 113.6 | 106.6 | | 163.6 | 107.5 |
| Blend | 131.6 | 114.1 | 99.6 | 146.9 | 162.1 | 100.8 |
| Blend-Betsopa | 132.9 | 116.8 | 98.1 | 147.2 | 162.1 | 101.6 |
| Blend-3APTES | 143.8 | 125.5 | 101.0 | | 165.6 | 100.2 |
| Blend-Betsopa-3APTES | 147.6 | 129.0 | 104.0 | | 165.1 | 104.3 |
| Blend-C20A-3APTES | 141.0 | 128.7 | 102.8 | | 165.2 | 104.0 |
| PP-3APTES | 133.0 | 115.2 | 98.9 | | 162.9 | 102.2 |

Therefore, the reaction between the MA portion of PP-g and 3APTES enhances the HDT of neat polypropylene without losing its softening temperature.

The Blend-C20A-3APTES exhibits similar improvement in HDT and vicat softening point as Blend-Betsopa-3APTES.

Crystallization and Melting Behavior

Figure 8:
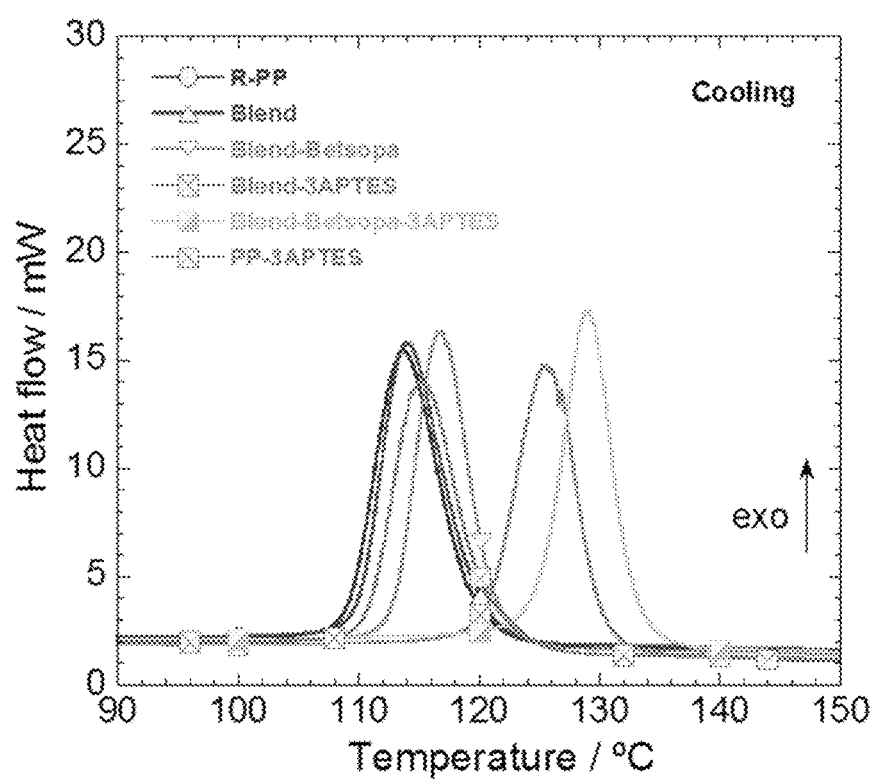
FIG. 8 is a thermogram obtained during crystallization of the R-PP, Blend, Blend-Betsopa, Blend-3APTES, Blend-Betsopa-3APTES and PP-3APTES from the melt state.

The temperatures and enthalpies associated with the crystallization and the melting of neat polymer and different blends and composites are reported in Table 3. According to this table and the thermograms presented in FIG. 8, the crystallization starts at much higher temperature in the 3APTES containing blend and composites when compared with neat polymers. In the case of R-PP, the onset of crystallization ($T_{c\ onset}$) appears at 134.7° C. The onset of the crystallization process becomes hindered in the presence of PP-g. Therefore, $T_{c\ onset}$ moves toward a lower temperature in the Blend. The incorporation of Betsopa does not have a significant effect on the crystallization process. However, the 3APTES-containing blends and composites show noticeable shifts in $T_{c\ onset}$ towards higher temperatures. The crystallization peak temperatures $T_c$ show similar trends to $T_{c\ onset}$. The $T_c$ of R-PP is 113.6° C., while the of Blend- Therefore, the formation of N-substituted maleimide and the presence of nanoclay facilitate the crystallization of PP at a higher temperature. To the best of our knowledge, this is the first report where about 15.5° C. improvement in crystallization temperature has been achieved for isotactic PP homopolymer. The enthalpy of crystallization ($\Delta H_c$) decreases slightly in the Blend and Blend-Betsopa samples compared with R-PP. $\Delta H_c$ remains almost unchanged in the 3APTES-containing blend and composite samples in comparison to R-PP, suggesting the extent of crystallization remains constant in the 3APTES-containing blends and composites.

Figure 9:
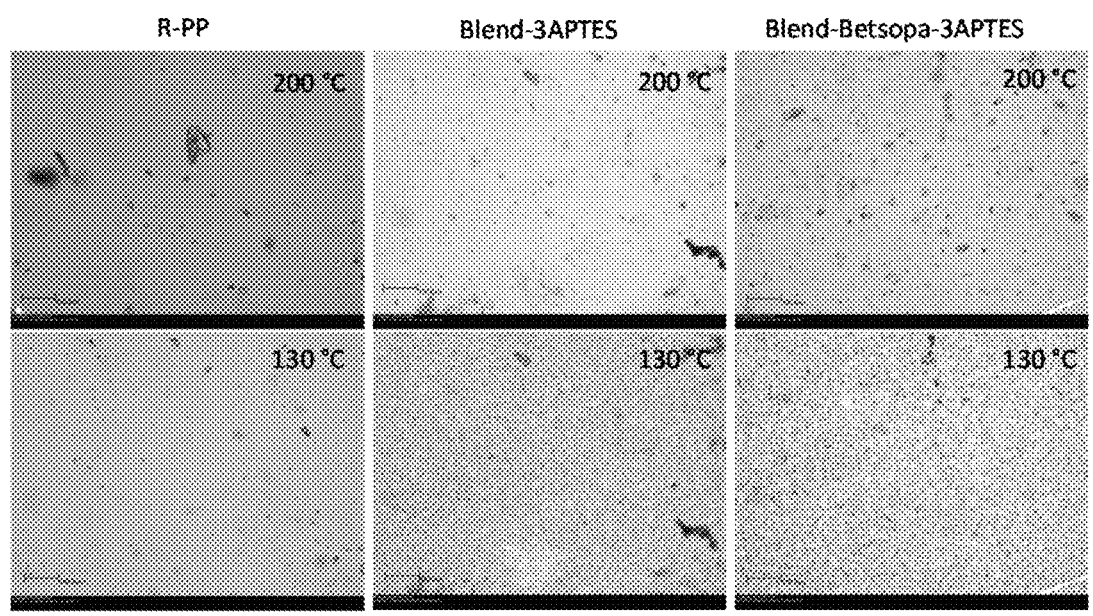
FIG. 9 is a polarized optical microscopic images for R-PP, Blend-3APTES and Blend-Betsopa-3APTES captured at 200° C. (in the molten state) and during nonisothermal crystallization at 130° C. wherein the cooling rate was 10° C./min.

To understand the role of 3APTES on the nucleation during crystallization process, PP was also blended with only 3APTES (Sample ID: PP-3APTES). The ratio of PP and 3APTES was held constant as in Blend-3APTES. According to Table 3 and FIG. 8, 3APTES does not play a significant role in the crystallization process of neat PP. Therefore, the significant improvement in crystallization temperature in the 3APTES containing blend can be attributed to the formation of the branched structure. A further improvement in crystallization temperature can be obtained in the presence of both 3APTES and Betsopa. The dispersed nanoclay layers in Blend-Betsopa-3APTES act as nucleating sites for the growth of the crystals. Zhanh et al. [25] reported that the branching may restrict the movements of the polymer chains in the melt state and, therefore, may generate a higher number of stable nuclei. The branching and dispersed nanoclay layers restrict the movement of the chains in the melt, thus generating a higher number of stable nucleation sites as shown in the polarized optical microscopic images reported in FIG. 9.

According to this figure, crystallization is almost complete in the 3APTES-containing blends and composites at 130° C., while neat R-PP does not show any crystal growth. During successive heating, the crystals formed during the crystallization process melt under a under a single endotherm in the case of R-PP and the 3APTES-containing blends and composites. The appearance of two melting peaks during the melting of Blend and Blend-Betsopa most likely indicates inhomogeneity in the crystallite size. It is interesting to note that the main melting peak temperature shifts towards higher temperatures in the 3APTES-containing blends and composites compared with the neat polymer. Blend and Blend-Betsopa exhibit lower melting temperatures. The enthalpies of fusion ($\Delta H_f$) remain fairly constant in all of the samples.

Both Blend-C20A-3APTES and Blend-Betsopa-3APTES showed almost the same extent of improvement in the crystallization and the melting temperatures when compared with the neat polymer.

In conclusion, formation of N-substituted maleimide-grafted PP which is responsible for the improvement in the thermal properties of neat PP remains irrespective of the choice of the nanoclay silicate layers.

Example of Pilot (/Industrial) Scale Production

The reactive blend process can be upgraded to pilot-scale production and a detailed investigation has been carried out on the thermo-mechanical properties. The sample is coded as Polyzimo DC741. This sample comprises of polypropylene, carboxylic anhydride or the furan type moiety grafted polypropylene and amino silane. The composition ratio of polypropylene:carboxylic anhydride or the furan type moiety grafted polypropylene was about 98:2=49:1. Some of the key properties of the pilot-scale samples are tabulated in the Table 4. For comparison the properties of neat polypropylene are also tabulated in the Table 4.

TABLE 4

Thermal and mechanical properties of neat PP, and Polyzimo DC741

| Properties | PP | Polyzimo DC741 | Unit |
|---|---|---|---|
| Onset degradation (5-wt %) temperature | 259.4 | 274.9 ± 1.5 | ° C. |
| Melting temperature | 164.3 ± 0.2 | 165.8 ± 0.1 | ° C. |
| Crystallization temperature | 117.9 ± 1.4 | 125.8 ± 0.06 | ° C. |
| Heat deflection temperature (0.45 MPa) | 53.1 ± 0.8 | 61.7 ± 3.1 | ° C. |
| Vicat softening point (10 N) | 155.3 ± 0.2 | 156.1 ± 0.1 | ° C. |
| Charpy Impact resistance | 9.4 ± 0.9 | 11.0 ± 1.0 | kJ/m$^2$ |
| Tensile modulus (100 mm/min) | 1303.4 ± 87.2 | 1423.8 ± 82.6 | MPa |
| Tensile strength (100 mm/min) | 34.6 ± 0.5 | 38.5 ± 0.4 | MPa |
| 6. Flexural modulus at | | | |
| (i) −60° C. | 2.4 e$^9$ | 4.2 e$^9$ | Pa |
| (ii) 25° C. | 4.1 e$^8$ | 1.7 e$^9$ | |
| (iii) 90° C. | 4.2 e$^7$ | 4.2 e$^8$ | |

It is clear from the table that Polyzimo DC741 exhibits better thermal and mechanical properties than the neat PP. The better properties include an exceptional improvement in crystallization temperature with moderate improvement in heat distortion temperature, stiffness (measured by tensile modulus), strength and impact resistance. On one hand, the improvement in crystallization temperature will reduce the cycle time of moulding process. On the other hand, improvement in HDT without loss of vicat softening temperature, stiffness, strength and impact resistance will allow to design dimensionally stable plastic products.

REFERENCES

1. Keskanok Kawka thesis on "A study on silane grafting and water crosslinking of polypropylene and its filled composites". Downloaded on Aug. 7, 2015.
2. K sirisinha, K Kawko. Crosslinkable polypropylene composites made by the introduction of silane moeities. J Appl Polym Sci 2005; 97: 1476-83
3. Zheng Y, Shen Z, Ma S, Cai C, Zhao X, Xing Y, Guo B, Zeng X, Wang L. Influence of recyled glass fibers from nonmetals of waste printed circuit boards on properties and reinforcing mechanism of polypropylene composites. J Appl Polym Sci 2010; 118: 2914-20.
4. Nalini R, Nagarajan S, Reddy B S R. Polypropylene-blended organoclay nanocomposites—preparation, characterization and properties. J Experimental Nanoscience 2013; 8: 480-92.
5. Santos K S, Liberman S A, Oviedo M A S, Mauler R S. Polyolefin-base3d nanocomposites: The effect of organoclay modifier. J Polym Sci: Part B: Polym Phys, 2008; 46: 2519-31.
6. Zeng A, Zheng Y, Guo Y, Qui S, Cheng Lei. Effect of tetra-needle-shaped zinc oxide whisker (T-ZnOw) on mechanical properties and crystallization behaviour of isotactic polypropylene. Materials and Design 2012; 34: 691-98.
7. González-Sánchez C, González-Quesada M, de la Orden M U, Martinez Urreaga J. Comparison of the effects of polyethylenimine and maleted polypropylene coupling agents on the properties of cellulose-reinforced polypropylene composites. J Appl Polym Sci 2008; 110: 2555-62.
8. Chattopadhyay S K, Khandal R K, Uppaluri R, Ghoshal A K. Babboo fibre reinforced polypropylene composites and their mechanical, thermal, and morphological properties. J Appl Polym Sci 2011; 119: 1619-26.
9. Schombourg J F, Kraxner P. Silane Vulcanized Thermoplastic Elastomer. European patent EP 1 021 486 B1. Downloaded on Feb. 27, 2015.
10. Wibowo A C, Misra M, Park H-M, Drzal L T, Schalek R, Mohanty A K. Biodegradable acetate from cellulose caetate: Mechanical, morphological and thermal properties. Composites Part A: Appl Sci and Manufacturing 2006; 37: 1428-33.
11. Han L, Li X, Li Y, Huang T, Wang Y, Wu J, Xiang F. Influence of annealing on microstructure and physical properties of isotactic polypropylene/calcium carbonate composites with β-phase nucleating agent. Mater Sci Eng 2010; 527: 3176-85.
12. Shi Y-H, Dou Q. Crystallization, mechanical properties and heat resistance of β-nucleated isotactic polypropylene. Polymer-Plastics Technol Engineering 2012; 51: 1024-31.
13. Fiebig J, Gahleitner M, Paulik C, Wolfschwenger J. Ageing of polypropylene: process and consequences. Polymer Testing 1999; 18: 257-66.
14. K sirisinha, K Kawko. Properties and characterization of filled poly(propylene) composites crosslinked through siloxane linkage. Macromol Mater Eng. 2005; 290: 128-35.

15. Yamamoto N, Isol M, Yoda M, Wada S. Process for the production of modified polyolefin. U.S. Pat. No. 4,146,529. Downloaded on Aug. 12, 2015.
16. Liu X, Wu Q. PP/clay nanocomposites prepared by grafting-melt intercalation. Polymer 2001; 42: 10013-19.
17. Lee S H, Kim S Y, Youn J R. Effect of maleination and heat treatment on morphology and dynamic mechanical thermal behaviour of polypropylene/organoclay nanocomposites. Composites: Part A 2009; 40: 968-74.
18. Revilla-Diaz R, Sánchez-Valdés S, López-Campos F, Medellín-Rodríguez F J, López-Quintanilla M L. Comparative characterization of PP nano- and microcomposites by in-mold shrinkage measurement and structural characteristics. Macromol Mater Eng 2007; 292: 762-68.
19. Dotson D L. Highly nucleated syndiotactic polypropylene. U.S. Pat. No. 6,887,963 B2.
20. Socrates G. Infrared and Raman characteristic group frequencies. Third edition, John Wiley & Sons, Ltd.
21. Introduction to Fourier Transform Infrared Spectroscopy, http://mmrc.caltech.edu/FTIR/FTIRintro.pdf, downloaded on Jul. 9, 2015.
22. Mohan J. Organic spectroscopy: principles and applications. Second edition, Alpha Scientific International Ltd.
23. Mezger T G. The rheology handbook. 2nd Edition, Vincentz Network GmbH & Co.
24. Carrot C, Guillet J. From the dynamic moduli to molecular weight distribution: A study of various polydisperse linear polymers. J. Rheol 1997; 41: 1203-20.
25. Zhang Y, Tiwary P, Gui H, Kontopoulou M, Parent J S. Crystallization of coagent-modified polypropylene: effect of polymer architecture and cross-linked nanoparticles. Ind. Eng. Chem. Res. 2014; 53:15923-31.

The invention claimed is:
1. A process for producing an isotactic polypropylene based composite, comprising: reactive blending of an isotactic polypropylene homo-polymer; a polypropylene grafted with a carboxylic anhydride or a furan type moiety; and an amino silane, in the presence of an organically modified nanoclay to produce an isotactic polypropylene based composite.
2. The process as claimed in claim 1, wherein an inorganic content of the organically modified nanoclay in the composite is kept constant in a range of about 0.5 to about 2 wt %.
3. The process as claimed in claim 2, wherein the inorganic content of the organically modified nanoclay in the composite is kept constant at about 1 wt %.
4. The process as claimed in claim 1, wherein a grafting level of the carboxylic anhydride in the polypropylene grafted with the carboxylic anhydride or the furan type moiety in the polypropylene grafted with the furan type moiety is in a range of about 0.5% to about 2%.
5. The process as claimed in claim 4, wherein the grafting level of the carboxylic anhydride in the polypropylene grafted with the carboxylic anhydride or the furan type moiety in the polypropylene grafted with the furan type moiety is about 1%.
6. The process as claimed in claim 1, wherein a molar mass ratio of carboxylic anhydride or the furan type moiety: an amino silane is in a range of about 0.5:0.33 to about 1:2.
7. The process as claimed in claim 6, wherein the molar mass ratio of carboxylic anhydride or the furan type moiety: an amino silane is about 1:1.

8. The process as claimed in claim 1, wherein a composition ratio of polypropylene:carboxylic anhydride or the furan type moiety grafted polypropylene is in a range of about 49:1 to about 1:1.
9. The process as claimed in claim 8, wherein the composition ratio of polypropylene:carboxylic anhydride or the furan type moiety grafted polypropylene is about 3:1.
10. The process as claimed in claim 1, wherein the polypropylene grafted with a carboxylic anhydride is a maleic anhydride grafted polypropylene.
11. The process as claimed in claim 1, wherein the amino silane is a (3-aminopropyl)triethoxysilane.
12. The process as claimed in claim 11, wherein the reaction between the maleic anhydride grafted polypropylene and (3-aminopropyl)triethoxysilane produces N-substituted maleimide-grafted polypropylene.
13. The process as claimed in claim 12, wherein the N-substituted maleimide-grafted polypropylene is represented by the structure:

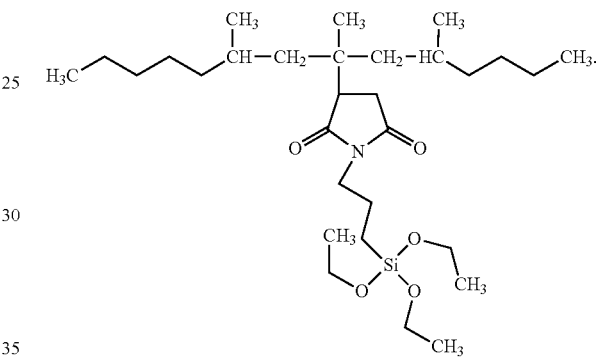

14. The process as claimed in claim 1, wherein the organically modified nanoclay is nanoclay silicate layers.
15. The process as claimed in claim 14, wherein the nanoclay silicate layers is a 2:1 layered silicate modified with a thermally stable surfactant suitable for the preparation of isotactic polypropylene based composite.
16. The process as claimed in claim 15, wherein the thermally stable surfactant is a 2 hydrogenated tallow quaternary ammonium surfactant.
17. The process as claimed in claim 1, wherein the organically modified nanoclay is Betsopa OM™.
18. The process as claimed in claim 1, wherein the crystallization temperature of the isotactic polypropylene based composite is in a range of about 120° C. to about 126° C.
19. The process as claimed in claim 18, wherein the crystallization temperature of the isotactic polypropylene based composite is about 125.5° C.
20. The process as claimed in claim 1, wherein the crystallization temperature of the isotactic polypropylene based composite is in a range of about 126° C. to about 135° C.
21. The process as claimed in claim 20, wherein the crystallization temperature of the isotactic polypropylene based composite is about 129° C.
22. The process as claimed in claim 1, wherein the crystallization temperature of the isotactic polypropylene based composite is in a range of about 6° C. to about 13° C. above the crystallization temperature of a neat polypropylene polymer.

23. The process as claimed in claim 22, wherein the crystallization temperature of the isotactic polypropylene based composite is about 12° C. above the crystallization temperature of a neat polypropylene polymer.

24. The process as claimed in claim 1, wherein the crystallization temperature of the isotactic polypropylene based composite is in a range of about 13° C. to about 21° C. above the crystallization temperature of a neat polypropylene polymer.

25. The process as claimed in claim 24, wherein the crystallization temperature of the isotactic polypropylene based composite is about 15.5° C. above the crystallization temperature of a neat polypropylene polymer.

26. An isotactic polypropylene based composite produced according to the process as claimed in claim 1.

* * * * *